[54] ARRANGEMENT FOR CHANGE-OVER CONTACT APPARATUS PROTECTION WITH INTERLOCKING MEMBER AND MODULE

[75] Inventors: Bernard Fournier, le Plessis Bouchard; Maurice Contal, Nanterre; André Vergez, Villenes, all of France

[73] Assignee: La Telemecanique Electrique, France

[21] Appl. No.: 38,671

[22] Filed: Apr. 15, 1987

[30] Foreign Application Priority Data

Apr. 23, 1986 [FR] France ................................ 86 06138

[51] Int. Cl.⁴ ........................ H02H 7/08; H01H 50/18

[52] U.S. Cl. ........................................ 361/24; 361/90; 361/99; 361/105; 335/20; 335/23; 335/132; 335/160; 200/50 C

[58] Field of Search ........................ 361/23, 24, 25, 26, 361/31, 32, 33, 34, 93, 99, 92, 102, 105, 142, 190, 191, 192; 307/112, 113, 115, 131, 142, 138; 335/160, 131, 132, 20, 23, 6, 11, 13; 200/50 C

[56] References Cited

U.S. PATENT DOCUMENTS

| | | | |
|---|---|---|---|
| 3,815,063 | 6/1974 | Grunert et al. | 200/50 C |
| 4,016,518 | 4/1977 | Lang et al. | 361/92 |
| 4,276,527 | 6/1981 | Gerbert-Gaillord et al. | 335/23 |
| 4,506,245 | 3/1985 | Leruicle et al. | 335/160 |
| 4,513,181 | 4/1985 | Boysen et al. | 200/50 C |
| 4,679,016 | 7/1987 | Ciarcia et al. | 335/23 |

*Primary Examiner*—A. D. Pellinen
*Assistant Examiner*—H. L. Williams
*Attorney, Agent, or Firm*—William A. Drucker

[57] ABSTRACT

A changeover contact-making apparatus with interlocking member and module of protection protected against overcurrents is provided. In a same case, two contact-making systems and coil switches are disposed on each side of a median plane PP' in which the interlocking member is placed. In one of the case inner volumes defined by the plane PP' are placed a single protection module, a tripping mechanism and the respective connection terminals.

14 Claims, 9 Drawing Sheets

ARRANGEMENT FOR CHANGE-OVER CONTACT APPARATUS PROTECTION WITH INTERLOCKING MEMBER AND MODULE

BACKGROUND OF THE INVENTION

1. Field of the Invention

The invention relates to a combined changeover contact-maker apparatus in which each of two systems of three phase and isolated switches having input and output terminals, is respectively associated with the mobile armature of one of two electromagnets able to be driven exclusively, reciprocal mechanical locking means being disposed between the mobile armatures so that each one, by its movement, prohibits that of the other, whereas first electric interconnection means are formed between the input terminals and the output terminals so as to cause changeover of two phases applied to a motor depending on whether one or other of the electromagnets is energized.

2. Description of the Prior Art

Such apparatus are very widely used in industry, particularly in that of lifting and handling appliances, for reversing the direction of rotation of the motor. Depending on the case, these apparatus comprise:

either two conventional contact-makers associated together and between which is disposed a mechanical locking case, or two electromagnet systems mounted in the same casing and capable of moving the same set of mobile contact bridges in opposite directions between two sets of separate fixed contacts.

In the first case, the user must generally effect the mechanical association and himself provide the electric connection of 12 terminals.

In the other case, the positioning of a reciprocal locking means is not required, and the apparatus only has:

three terminals for the electric connection to the network and three terminals for the electric connection to the motor, which forms an advantage for the user.

If thermal and/or magnetic protection means are desired for the motor, the user must place in series an appropriate protection apparatus and this apparatus reacts appropriately to overloads, whatever the direction of rotation of the motor.

When it is desired to integrate two contact-makers and thermal protection means in one and the same case, several possibilities may be conceived.

According to one of these conceptions, based on the first case of mounting, a bulky assembly will be the result.

According to the other conception, the volume occupied will be slightly less.

In both cases, additional electric connections must be formed externally, either because of the arrangement of the terminals of the switches, or because of the opposed arrangement of the two electromagnets with respect to the switches.

Contact-maker apparatus are further known, which may be used for driving the multiphase motors in a single direction, including in the same case thermal and magnetic protection means as well as a means (manual or remote controlled) for locally resetting these protection means. Such an apparatus, which may be illustrated by the U.S. Pat. No. 4,495,538 of the assignee, is also protected against short circuit currents.

The prior existence of such apparatus might lead the user of a motor operable in two directions to an association comparable with that mentioned above; the presentation of the cases of these apparatus makes it however difficult to place mechanical locking means therebetween; in addition, the fact that, depending on the direction of operation, only one of the two thermal protection systems is engaged, makes illusory the protection which might have been hoped for because of the fact that each of the two bimetallic strip systems generally used for this purpose only gives an incomplete image of the thermal state of the motor.

The invention proposes consequently providing in the same case a changeover contact making apparatus which is reliably protected against small and extended overloads, against instantaneous overcurrents and against short circuit currents while being provided with mechanical locking means and a single resetting member and only having externally three terminals for connection to the network and three terminals for connection to the load; this apparatus will further offer the user the faculty of assocating with each of the electro-magnet armatures, at will and without any possible error, sets of appropriate auxiliary contacts in a sufficiently large number so that auxiliary signals generally desired for each of the directions may be developed in addition to those which are intended for the electric locking circuit of the coil currents of the contact-makers.

SUMMARY OF THE INVENTION

The invention attains this aim because of the fact that:

two identical electro-magnet systems and associated phase switches are disposed parallel on each side of a median plane PP', belonging to the same base fixed against a wall;

a removable thermal and magnetic protection module equipped with output terminals being disposed on the same side of this plane, as well as corresponding input terminals housed in the base;

whereas a reciprocal locking device, adapted for preventing the simultaneous movement of the armatures of these electro-magnets, is housed in this plane and a bundle of conductors providing crossing of the phases is placed transversely between the switches and the input terminals in a region adjacent the face of the base bearing against the wall.

Among the advantages offered by the arrangement described, we may note that, in accordance with a second aim of the invention, it allows the positioning, if required, of a general disconnecting switch in the same case, without an additional increase of bulk.

If this faculty is used, additional measures must be taken in the arrangement of the crossed phase interconnection conductors which, without that, might indifferently have one or other of the two arrangements, namely: one downstream and the other upstream of the changeover switches.

An additional gain in volume may be obtained, according to another objective of the invention, by a particular confirmation of the mechanical locking device, the sum of the gains in volume obtained further allowing, if required, the incorporation of auxiliary contacts and/or additional protection devices in the same case having a volume substantially twice that of the known apparatus.

BRIEF DESCRIPTION OF THE DRAWINGS

The invention, as well as the accompanying measures which have just been mentioned, will be better understood from reading the following description with reference to the accompanying Figures in which.

DESCRIPTION OF THE PREFERRED EMBODIMENTS

Figure 1:
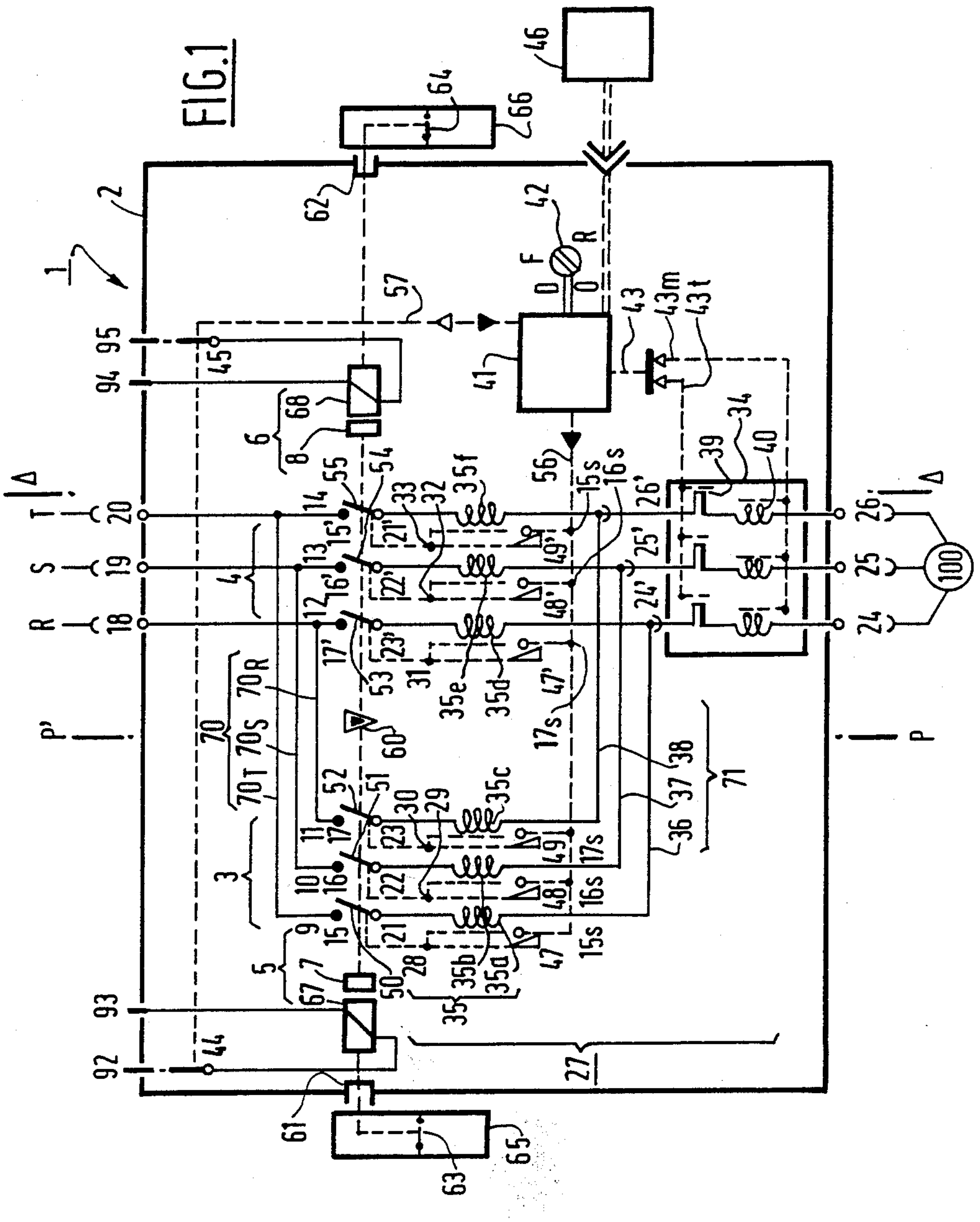
FIG. 1 is an electric diagram of the apparatus of the invention.

The electric diagram of a protected changeover contact making apparatus 1 of the invention, which is illustrated in FIG. 1 in the open and non tripped state, includes a general case 2 containing two identical three phase contact making systems 3 and 4; each system comprises consequently an electromagnet 5, respectively 6, whose armature 7, respectively 8, actuates the phase switches 9, 10, 11 and, respectively, 12, 13, 14.

On the upstream side of the mains RST, input terminals 15, 16, 17, 15', 16', 17' of these switches are connected, on the one hand, to three general input terminals 18, 19, 20 and, on the other, are connected together through a first bundle 70 if interconnecting conductors $\mathbf{70}_R$, $\mathbf{70}_S$, $\mathbf{70}_T$.

The other terminals 21, 22, 23, 21', 22', 23' of the switches are connected to three output terminals 24, 25, 26 for connection to the motor 100, through a general protection device 27 including, on the one hand for limiting the short circuit currents, a multiplicity 35 of particular magnetic coils 35*a* . . . 35*f* with plungers 28, 29, 30, 31, 32, 33 which coils have each flowing therethrough the current of a switch and, on the other hand, a removable protection module 34 which is on the downstream side connected to said output terminals and on the opposite side connected to these coils through a second bundle 71 of interconnecting conductors 36, 37, 38.

This protection module 34 is made removable with respect to the rest of the apparatus, so that each of the current detector elements going towards an output terminal, such as the bimetallic strip 39 and the magnetic coil 40, can be given dimensions appropriate to the intensity of the nominal current of the apparatus, so that it reacts appropriately either to the current overloads which last too long, or to instantaneous overcurrents caused by instantaneous overloads of a reversible motor 100.

A spring tripping mechanism 41, which has the faculty of being set by a manual control member 42, may be tripped either through mechanical transmission means 43*t*, 43*m*, 43 placed between this mechanism and this module 34, whose change of state it communicates following appearance of a corresponding fault current, or through mechanical transmission means 56 reacting to the movement of the plungers 35.

The tripping of this mechanism further causes the simultaneous opening of two confirmation switches 44, 45 placed respectively in series with each electromagnet coil 67, 68; these latter are supplied with power through the terminals 92, 93 respectively 94, 95.

Resetting of this mechanism is provided either by the manual member 42, or by an auxiliary remote controlled resetting case 46 whose case is associated with case 2.

Finally, it will be noted that the operating member may be placed manually (or through the remote controlled case) in an uncocked state 0 which causes the simultaneous opening of switches 44, 45 or a cocked state F which causes closure thereof when the thermal balance conditions are re-established.

During such resetting, module 34 is placed again in its rest state by mechanism 41 and bolts such as 47, 48, 49, 47', 48', 49', which maintain the mobile contacts 50, 51, 52, 53, 54, 55 of the phase switches in the open state, independently of the positions of the armatures, are themselves released by this mechanism and transmission 56 so as to leave them free to close again subsequently. These bolts are associated together by a transmission 56, whereas switches 44, 45 are associated together by a transmission 57 both extending from or to the mechanism 41.

A mechanical locking device 60 is placed between the two armatures of the electromagnets in a median plane PP' of case 2 which is parallel to a direction Δ passing through a corresponding output terminal and input terminal.

Finally, coupling means 61, respectively 62 are actuated by the armatures so as to transmit their state to two sets of auxiliary switches 63, 64 which are each placed in a particular case 65, respectively 66, adapted to be associated with the general case 2, respectively with a base thereof; these switches generally serve both for completing the mechanical locking by means of an external electric locking circuit and for providing different signalling requirements or operations related to each of the directions of rotation of the motor.

An examination of this general diagram calls forth a number of comments, namely:

on the one hand, the interconnecting conductor bundle 70, which provides crossing or reversal of the phases, is here placed upstream of the phase switch systems 3, 4 whereas such crossing could have been electrically provided in a region dowstream of the circuits where the bundle of interconnecting conductors 71 is placed providing direct connections between the phases;

on the other hand, the two switches 44, 45 are coupled so that the appearance of a fault detected by module 34 when the motor rotates in one direction simultaneously establishes the impossibility of supplying the coil with power which is apt to cause rotation in the opposite direction;

furthermore, the bolts 47, 48 . . . 48', 49' of all the plungers such as 28...33 are coupled directionally through the transmission 56 so that the appearance of a current fault having the intensity of an outright short circuit while the motor is rotating in one direction or in the other, causes the tripping D of mechanism 41. This change of state will therefore be followed by the simultaneous opening of the two confirmation switches 44, 45.

Figure 2:
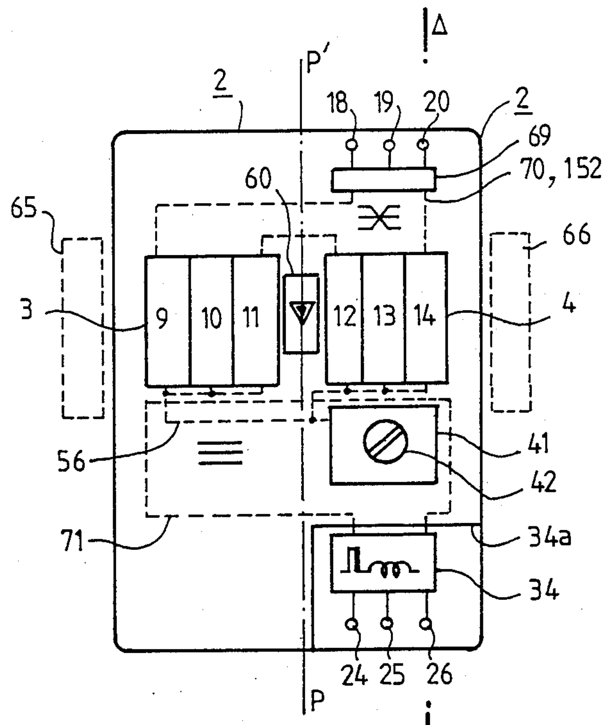
FIGS. 2 and 3 show diagrams illustrating the distribution of the different members of FIG. 1 in different regions of the same apparatus, in top views and by transparency.
Figure 3:
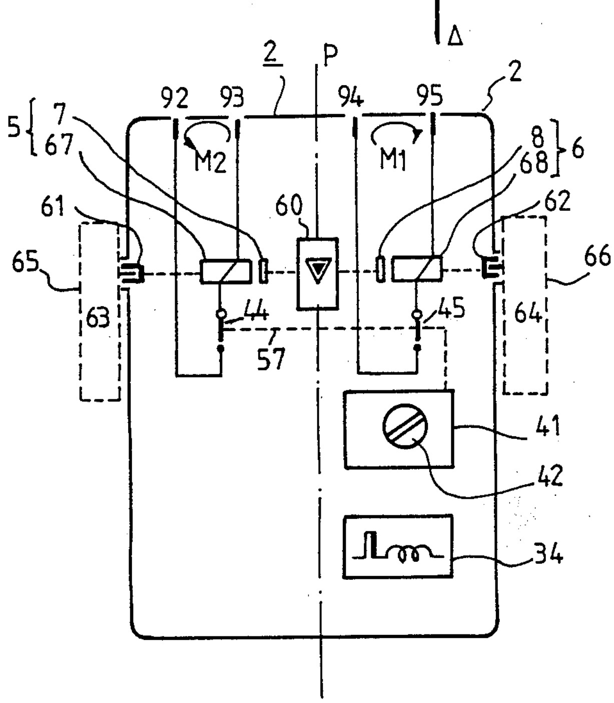
Figure 4:
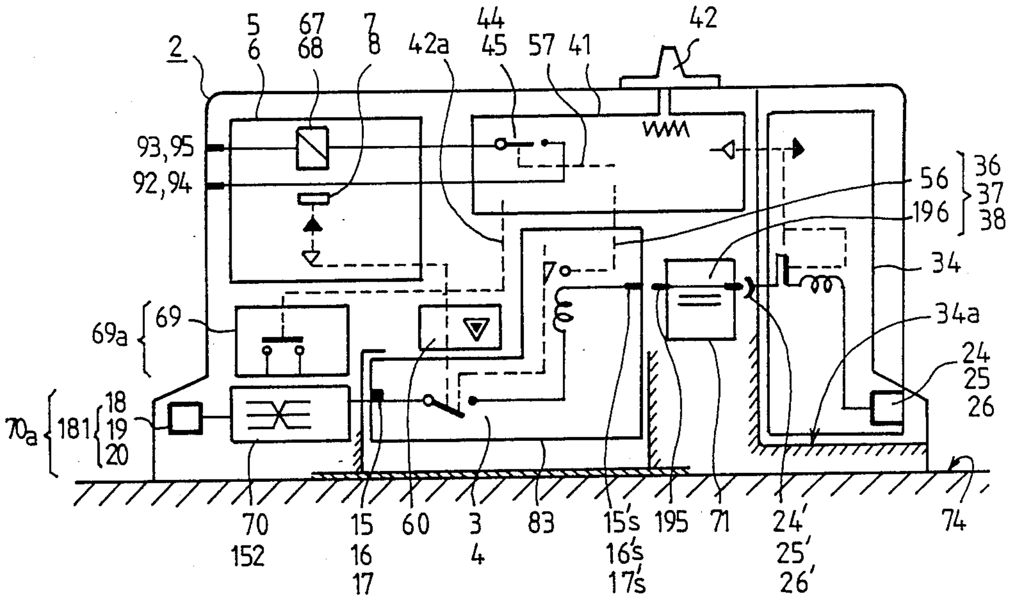
FIG. 4 shows schematically the distribution of the different members of the apparatus of FIGS. 1, 2 and 3, in a side view and by transparency.

In an advantageous embodiment, whose principle is shown in FIGS. 2 to 4, the distribution of the different elements of the apparatus inside the case provides for the arrangement of two assemblies each having a set of phase contacts and an identical corresponding electromagnet 3, 5 and, respectively 4, 6, on each side of a mean plane PP' which is perpendicular to the face 73 of the case applied to a fixing wall 74 and which passes through a reciprocal locking device 60 parallel to a straight line Δ passing through corresponding input terminal and output terminal. The connection terminals of the coils are placed in pairs 92, 93, respectively 94, 95 in each of the half spaces separated by the plane PP', by which the corresponding chosen direction of rotation orders $M_1$, $M_2$ may be identified.

Figure 5:
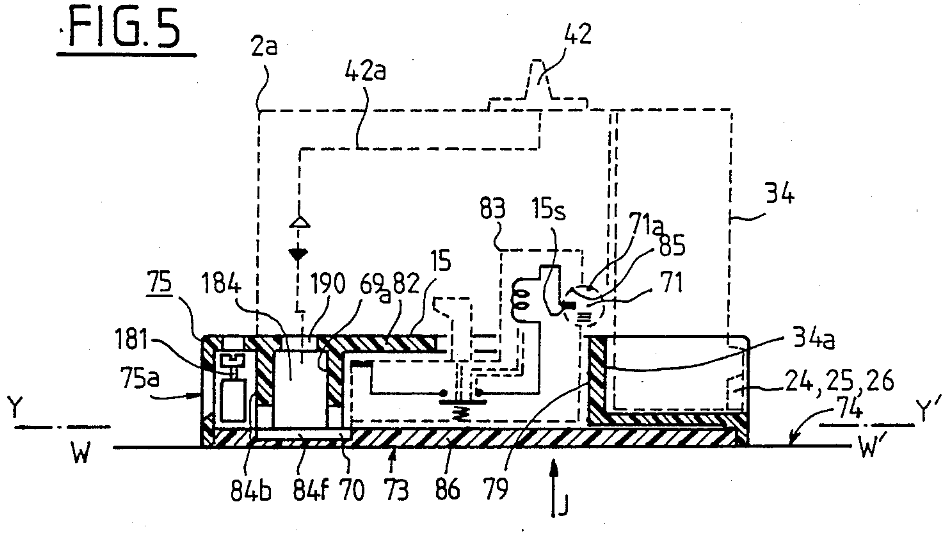
FIG. 5 shows more precisely the shape given to a base of the apparatus of the invention in section through a plane UU' of FIG. 6.
Figure 6:
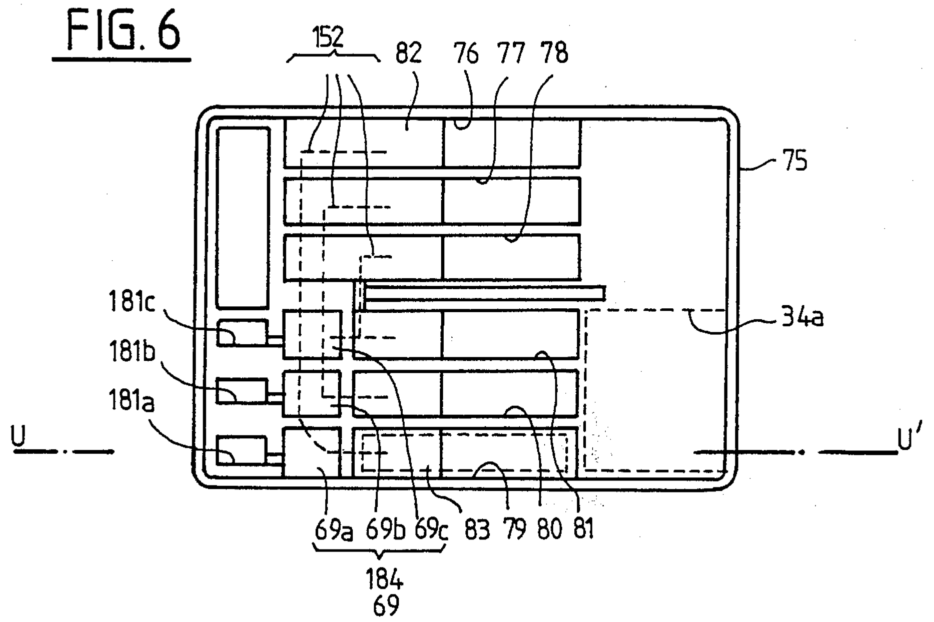
FIG. 6 shows a bottom view of the base without its cover and other members.

The surface 73 is carried by a base 75, see also FIGS. 5 and 6, which has a dividing wall parallel thereto 82, compartments such as 76 . . . 81 each adapted to receive a cartridge 83 comprising a phase switch 9...14, a limitation coil 35a...35f, a plunger 28...33 for the mobile switch contact and a bolt 47, 48; input and output terminals such as 15, 15s are disposed on these cartridges.

This dividing wall defines under it a first space 84f and a second space **84*b* which are placed between limiter contact cartridges 83 and a face 75*a* and which are adapted to receive, one, the bundle of interconnection conductors 70 respectively and, the other, housings 181*a*, *b*, *c* for input terminals such as 181; these spaces are closed by a cover 86** after insertion in the same direction J of the different cartridges, bundle and input terminals.

One of the advantages which will be recognized in the arrangement which has just been described resides more particularly in the possibility which is offered of placing a part of the interconnection conductors of the first bundle in a plane YY' which is in a region close to the base surface.

This arrangement in fact means that the crossed conductors benefit from being mechanically held by clamping between the dividing wall 82 and the cover 86, as will be seen subsequently.

Figure 9:
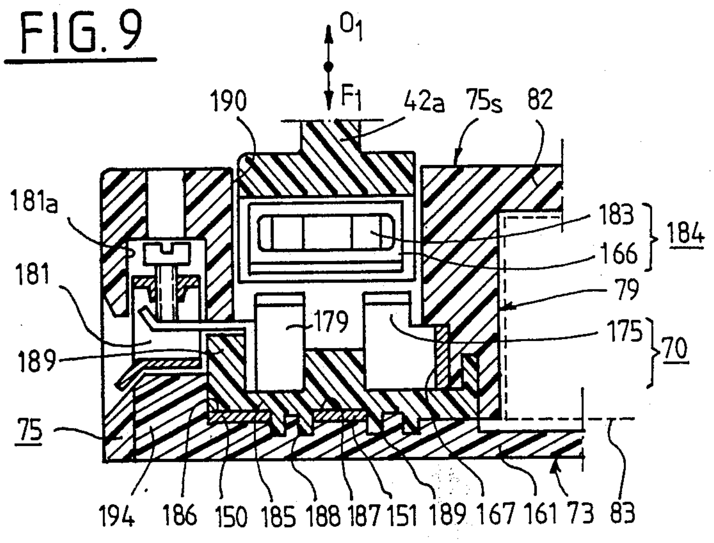
FIG. 9 shows with greater precision a detail of FIG. 5.
Figure 7:
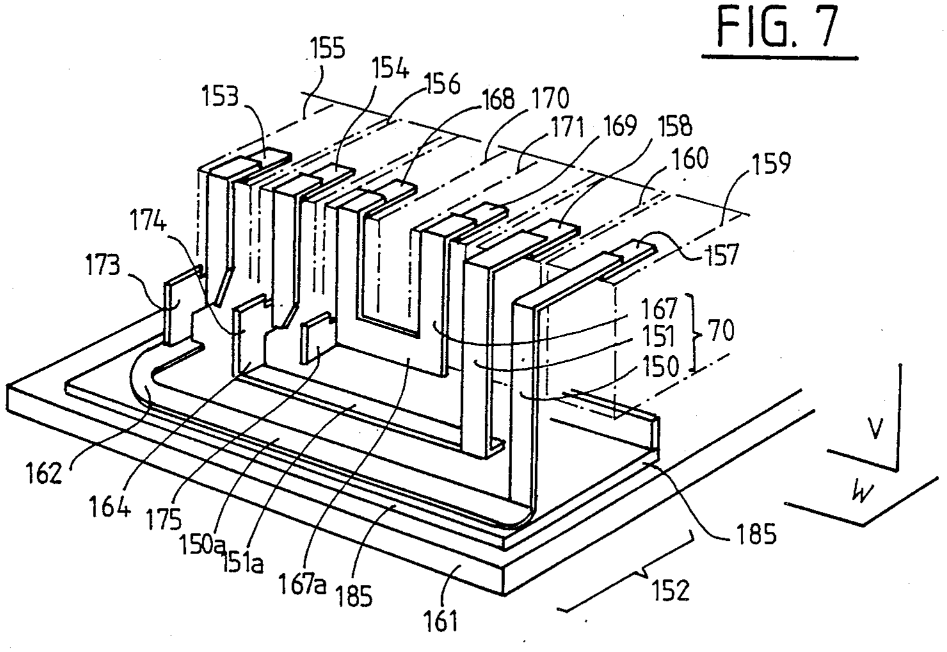
FIGS. 7 and 8 illustrate in two perspective views details of construction of a conductor bundle providing, on the one hand, the crossing of the phases and cooperating, on the other, with disconnecting means.
Figure 8:
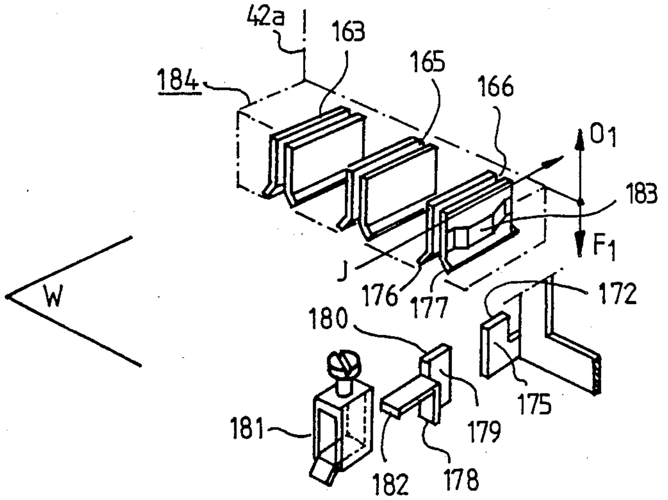

In an advantageous embodiment of the crossed conductor bundle 152, see FIGS. 7, 8, 9, this bundle will have a particular conformation for housing, in series with input terminals 181 and in a small volume **69*a*, situated in the immediate vicinity thereof, a disconnecting device illustrated by the rectangle 69 in FIGS. 4 or 2, or by the rectangle 184 in FIG. 5, where the presence of a cover 2*a* will also be noted for enclosing the elements of FIG. 4**.

This conformation will further take into account, on the one hand, the high electrodynamic forces which the crossed conductors are subjected to and, on the other, the influence of these forces on the mobile parts of the disconnecting device and, finally, the need to keep a suitable insulation therebetween.

For this, two parallel crossed conductors 150, 151, of the first crossed bundle 152, see FIG. 7, each formed from a flat metal ribbon made from an amagnetic material and in a single piece going from the terminals 153, 154 of the contact cartridges 155, 156 to the terminals 157, 158 of the cartridges 150, 160 are placed parallel to a plane W of the cover 161.

The conductor 150 includes a rounded portion of wide radius 162, see FIG. 8, so as to move it away from the mobile contact piece 163 of the disconnection device placed in the vicinity, whereas conductor 151 has a perpendicular bend 164 which is directed perpendicularly to the lines of the currents flowing through the other two mobile contact pieces 165, 166. The transverse portions **150*a*, 151*a*,** with respect to Δ of these conductors are substantially parallel to each other.

The third conductor 167 of the bundle, see FIG. 7, which is also made from an amagnetic conducting material of flat section, is itself placed in a plane V perpendicular to the lid and parallel to the other conductors for connecting together the terminals 168, 169 of the contact cartridges 170, 171; this conductor is itself placed perpendicularly to the current line J passing through the mobile contact piece 166 of the disconnecting device and outside the path of this line, see FIG. 8.

Each of these conductors 150, 151, 167 includes a portion 173, 174, 175 having a knife edge 172, see FIG. 7, which is adapted for receiving corresponding resilient jaws, such as 176, 177, of each mobile contact piece of the disconnecting switch, see FIG. 8; a second fixed amagnetic piece 178 of the disconnecting switch device, having an extension 179 with a knife edge 180, is placed in the same plane as portion 175 and is connected to the corresponding terminal such as 181 by a lug 182, see also FIG. 9.

The bundle 71 of direct conductors is formed for example, from flexible conductors which are channeled through a space **71*a* situated above the dividing wall 82, see FIG. 5.**

For facilitating the passage of this bundle, the protected contact cartridges such as 83 will be advantageously provided with a recess 85, see FIG. 5.

Figure 18:
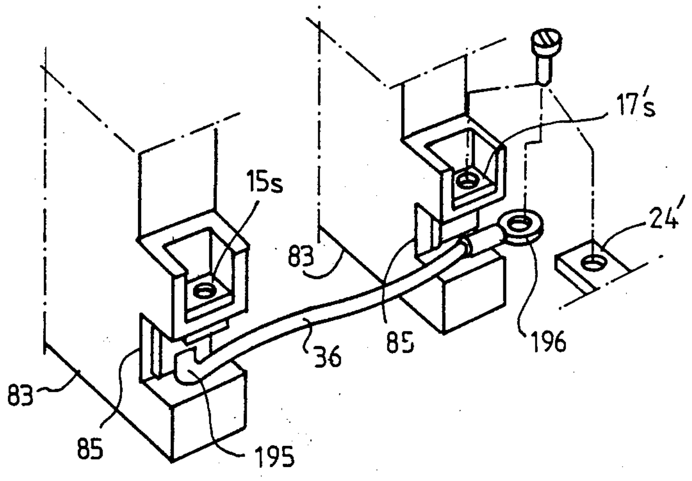
FIG. 18 shows in a local and partial perspective view a part of the direct conductor bundle.

One end 195 of each of these conductors such as 36 may be soldered directly to an output terminal of the cartridge such as **15*s*, whereas the opposite end 196 will be advantageously equipped with an annular terminal through which passes a connecting screw which is engaged either in a corresponding input terminal 24' of the protection module 34, or in a corresponding threaded terminal of the cartridge which is associated therewith 17's, see FIG. 18.**

Each of the jaws 176, 177 of the three mobile contact pieces 163, 165, 166 is subjected to the action of a lateral pressure spring such as 183, and the assembly of these members is disposed in an insulating contact holder 184 able to be moved in direction O1 or F1 for breaking or making the power supply from the mains, through a transmission **42*a*, passing through the opening 190 in the dividing wall as far as the mechanism 41, see also FIG. 5.**

These movements are communicated by the operating member 42 and for particular changes of position thereof, through an intermediate linkage not shown, and only visible in the form of a broken line 42*a* in FIG. 5.

The crossed conductors 150, 151, 167 and their respective insulations are held in position by means of an insulating plate 185 which has grooves 186, 187 adapted to receive parallel portions of the conductors of the crossed bundle and which have baffles 188, 189, 190, 191 capable of increasing the length of the leak lines between adjacent conductors, on the one hand, and between one of the conductors 150 closer to the input terminals such as 181, on the other, see FIGS. 7 and 9. The terminals such as 181 are held in pockets 181*a, b, c* by extensions 194 of the lid 161, this latter further having shapes adapted to those of the baffles, and openings not shown for fixing same to the base, see FIG. 9.

Figure 10:
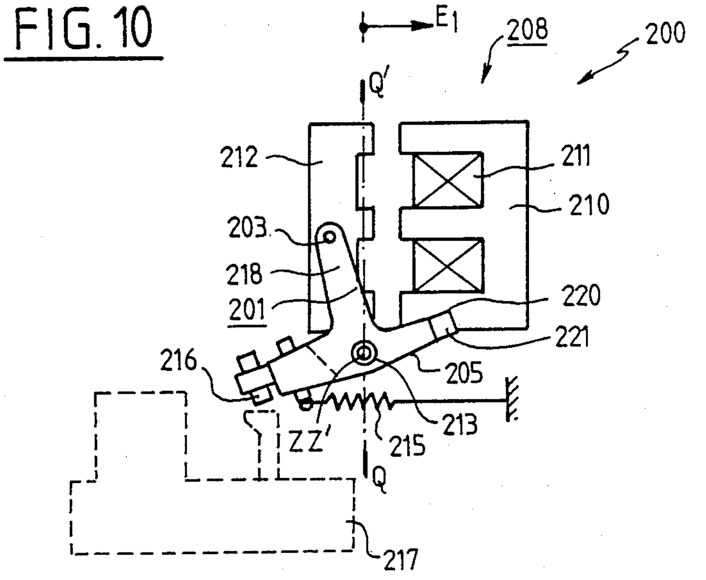
FIGS. 10 and 12 show, in partial opposed side views, the two pivoting systems for the electromagnet armatures intended to cooperate with a mechanical device.
Figure 11:
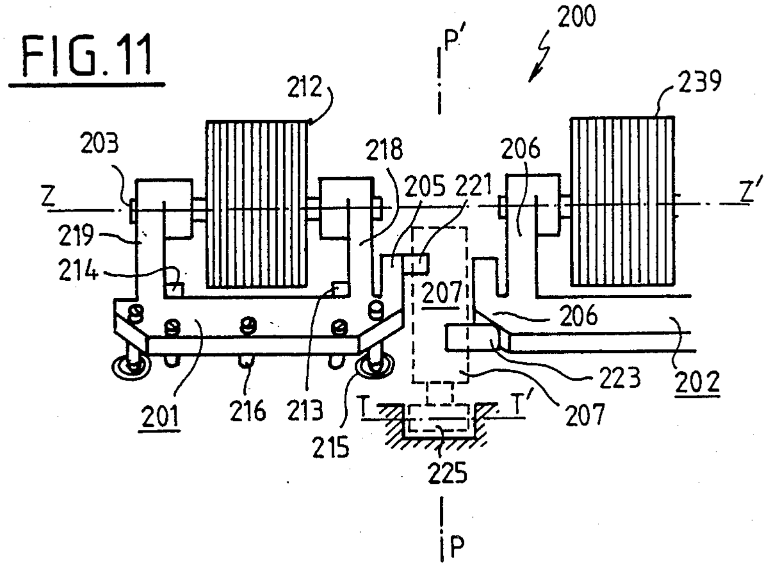
FIG. 11 shows a partial side view perpendicular to the preceding ones, in which the central arrangement of the locking device will be noted.

In the particular embodiment 200, shown in FIGS. 10 and 11, where the armatures of the two identical electro-magnets 208, 209 are each supported by an articulation of a lever system or pivoting supports 201, respectively 202, and in which these two supports are disposed side by side coaxially about the axis ZZ′, two adjacent arms 205, 206 of these supports each effect in turn parallel and identical movements of respectively low amplitudes.

A reciprocal locking device 207 placed between these two arms or levers must then be adapted to the conditions of reduced volume, and must take into account the difficulties resulting both from the variations of the manufacturing sizes while remaining efficient and from the existence of two parallel movements.

It is known that traditional locking systems owe their efficiency largely to the fact that the ends of two separate locking levers are placed in the vicinity of each other and effect tangential movements in perpendicular directions.

The purpose of the measures which will be described in the present locking arrangement is to obtain a locking effect which is just as efficient using a single lever, through adjustable coupling means for associating this lever with the armature supports.

Referring to FIGS. 10 and 11, it can be seen that the electromagnet 208 for example has a yoke 210 and a fixed coil 211, both fixed and opposite which is disposed an armature 212; this latter has a pivot pin 203 which is received by two arms 218, 219 of a support 201 for pivoting about an axis ZZ′ in two fixed bearings 213, 214. This support is associated with one or two return springs such as 215 and comprises adjustable pushers such as 216 each actuating one of the phase switches whose cartridge is shown with dotted lines at 217.

Figure 12:
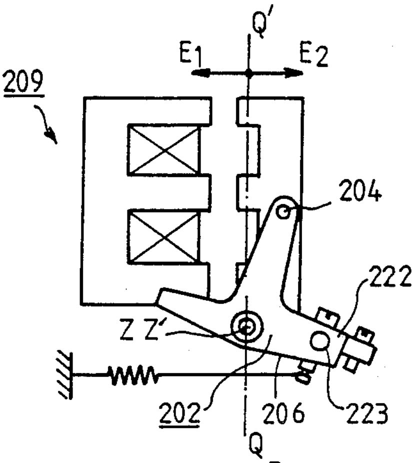

An arm 205 of support 210 has at its end 220, situated in a half space E1 limited by the plane QQ′ passing through ZZ′, see FIG. 10, a lateral extension 221 directed towards the other support 202, whereas this latter includes at one end 222 situated in the other half space E2 a cylindrical lateral finger 223 directed towards the support 201, see FIGS. 11 and 12.

Figure 13:
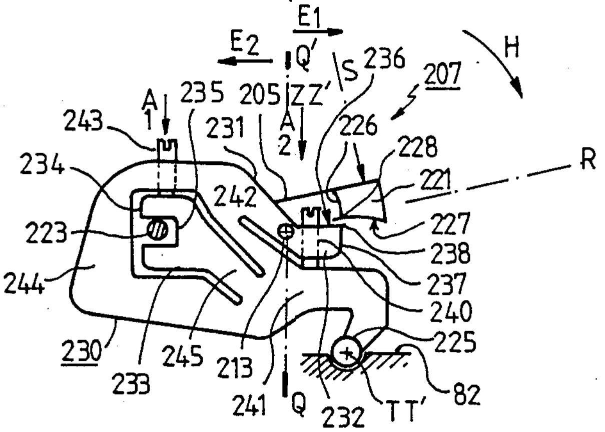
FIG. 13 shows, in a side view, a locking lever whose geometric properties are shown in FIG. 14.

The locking device 207 is here shown with dotted lines as a lever pivoting about a fixed pivot or cavity 225 with axis TT′, parallel to ZZ′, which is for example formed in the dividing wall 82 and in the median plane PP′. A more precise view of FIG. 13 shows that the lateral extension 221 has a first concave surface 226 concentric to the axis ZZ′ and a second concave surface 227 concentric to the axis TT′, these two surfaces intersecting along an edge 228.

In this same Figure, it can be seen that the locking device 207 has the form of a lever 230 with a first arm 231 whose end 232 is situated in the vicinity of the extension 221, and a second arm 233 whose end 234 in the shape of a fork 235 nips the finger 223; the end 232 has two convex surfaces 236 concentric to TT′, respectively 237 concentric to ZZ′, which intersect along an edge 238 placed in the immediate vicinity of edge 228.

Figure 14:
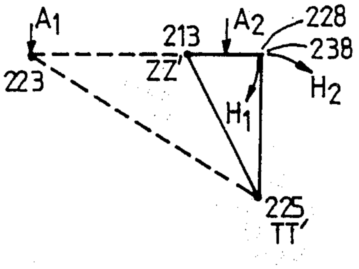

FIG. 14 shows in a geometric diagram that a triangle placed in the plane PP′ and passing through the points ZZ′, 228, 238 and TT′ is a rectangular triangle whose hypotenuse is ZZ′, TT′. The result is that the clockwise movements H of armature 212 or armature 239 when one of the electromagnets is energized, will produce corresponding movements H1 of the edge 228 and H2 of the edge 238.

In the first case, during a movement H1, the lever 230 and so support 202 will not be able to pivot because of the opposite positioning of surfaces 228 and 237; in the second case during a movement H2, the end 232 will position surface 236 opposite surface 227 and arm 205, as well as support 201, will not be able to pivot.

So that the movements which have just been described may be matched to the inevitable manufacturing tolerances for placing the edges 228 and 238 in the immediate vicinity of each other when the two electromagnets 208, 209 are at rest, a first adjustment screw 240 is disposed on the deformable arm 231 for bearing on a region 241 of lever 230 close to pivot 225, the root 242 of this first arm being further away from this pivot; furthermore, a second adjustment screw 243 is provided passing through a more rigid frame 244 surrounding the second deformable arm 233 and bears on the end 234, the root 245 thereof being closer to pivot 225 than to this end.

An examination of the geometric arrangement of these adjustment screws shows that the first screw is capable of adjusting the rest position of edge 238 in the H1 or reverse directions, whereas the second screw 243 adjusts the rest position of this same edge in the H2 or reverse direction; the access in directions A1 and A2 to these screws is from the same side which is accessible in the median plane PP′. The composite lever 230 is advantageously formed by molding a resiliently deformable plastic material.

Figure 15:
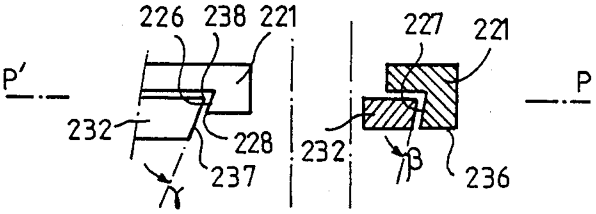
FIG. 15 illustrates two partial views of the preceding lever and a cooperating member, observed in the direction S or in section through the plane R.

In order to guarantee that the surfaces 226 and 237 or surfaces 236 and 227 cannot slide with respect to each other if the two electromagnets were accidently energized at the same time, the generatrices of these surfaces are given suitable slants $\alpha$ and $\beta$ with respect to the median plane PP′, see FIG. 15, which reinforce the locking effect by opposing sliding or a relative lateral movement of these surfaces when they are bearing against each other.

Figure 16:
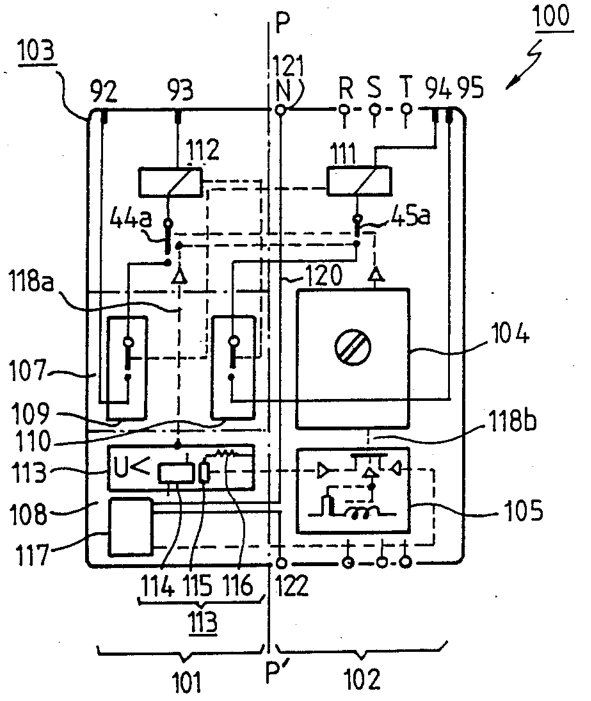
FIGS. 16 and 17 show two variants of construction of the electric locking circuitry of an apparatus of the invention.

Considering the arrangement of two substantially identical volumes 101, 102 existing in the same case 103 separated by the median plane PP′, and considering the fact that a mechanism 104 and a thermal module 105 are disposed solely in the right hand volume 102, see FIG. 16, it is possible, in order to obtain a better protected and just as compact apparatus 100, to use the corresponding regions 107, 108 of the left hand volume 101 for incorporating therein either sets of auxiliary contacts 109, 110 actuated respectively by each of the electromagnet armatures 111, 112, or a device for protection against the absence of voltage 113, with coil 114, armature 115 and the return spring 116. These latter will be preferably disposed in the vicinity of the thermal module 105 so as to be able to actuate in parallel the same mobile piece 118*b* which causes tripping of the mechanism 104; this protection device may in addition be removably disposed in the corresponding volume portion 108. As a variant, the protection device 113 may also act directly on the confirmation switches 44*a*, 45*a* through the transmission channel 118*a*.

In a variant, a fault detecting device 117 may also be placed in these volumes or in a part thereof, for possible currents resulting from a loss of insulation of a phase conductor with respect to the neutral conductor N: this naturally means that a corresponding neutral conductor 120 passes through the apparatus via an input terminal 121 and a corresponding output terminal 122.

Figure 17:
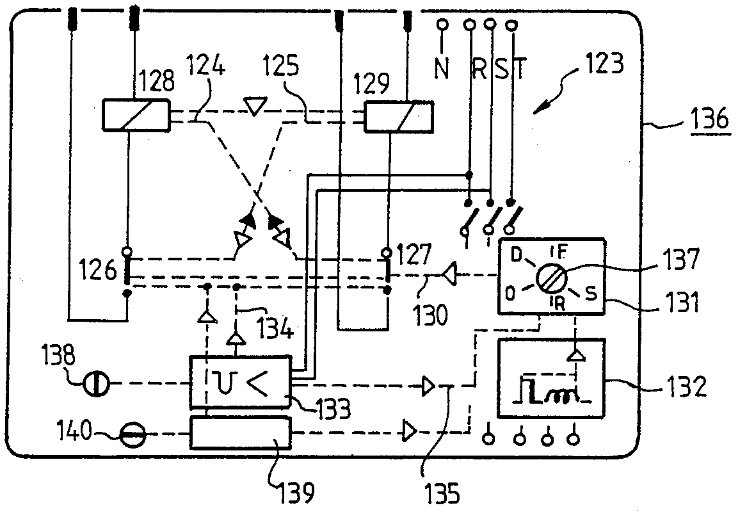

According to an additional measure for simplifying the circuitry 123 of the reciprocal electric locking of the two coils of the electro-magnets, see FIG. 17, crossed control means 124, 125 may be further provided for the two switches 127, 126 associated with the two respective electromagnets 128, 129 and with the mobile contacts of these switches may be associated additional simultaneous opening means 130, respectively 134 which come into action either when the mechanism 131 is tripped, automatically by the thermal and magnetic module 132, or respectively by the voltage monitoring device 133 or by the device monitoring the insulation faults 139.

If this mode of direct intervention of the monitoring device 133 or 134 is chosen in the place of an indirect action passing through the mechanism 131 and causing first of all tripping thereof by another channel 135, the open state of apparatus 136 will not be signalled by a corresponding position D of the local manual control member 137; the attention of the user may then be drawn by the appearance of a particular indicator lamp 138.

Comparable measures could naturally be taken if a fault current detecting device 139, associated with an indicator lamp 140, were used in this apparatus.

What is claimed is:

1. A change-over contact apparatus comprising in a main case having first and second inner spaces defined by a median plane and a supporting base at right angles with said median plane:

i- first and second isolated three phase switch system each having input terminals and output terminals, said first and second systems being respectively housed in the respective first and second spaces;

ii- first and second electromagnets having respective coils and separate means for energizing said respective coils, the first and second electromagnets being respectively housed in the respective first and second spaces and having first and second respective armatures which respectively control the first and second switch systems;

iii- mechanical inter armature locking means disposed between the first and second respective armatures and extending from side to side of the median plane;

iv- an elongate first bundle of electric conductors providing cross connection of the input terminals of the respective switch systems for causing a reversal of two phases, said bundle being oriented substantially at right angles with said median plane and located in a region close to said supporting base;

v- a removable thermal and magnetic overload detector module removably connecting the output terminal of the second switch system to output terminals of the apparatus, said detection module, the input and output terminals of the second switch and the output terminals of the apparatus being housed in said second space;

vi- an elongate second bundle of electric conductors providing direct phase to phase connection of the output terminals of the respective switch systems and vii- a tripping mechanism housed in said second space and coupled to the overload detector module and to the first and second switch systems for opening the said switch systems when the overload detector module has detected an overload.

2. The change-over contact apparatus as claimed in claim 1, wherein the armature of the first electromagnet drives first electric switching means for locking the second switch system, whereas the armature of the second electromagnet drives second electric switching means for locking the first switch system, said first and second electric switching means being respectively disposed in respective auxiliary cases placed outside the main case against the base thereof symmetrically with respect to said median plane, opposite in the respective armatures to which they are respectively coupled.

3. The change-over contact apparatus as claimed in claim 1, wherein said second bundle of conductors is disposed between the switch systems and a housing receiving the overload detector module.

4. The change-over contact apparatus as claimed in claim 1, wherein each of said switch systems includes a plurality of parallel switches, a coil is placed in series with each of said parallel switches and a plunger and a bolt are associated to each of said coils respectively for limiting the short circuit currents and for maintaining the switch open when the protection module has detected an overload, each switch, coil, plunger and bolt being disposed in a removable cartridge lodged in the base, said cartridge having an input terminal and an output terminal, the output terminals of the second switch system being connected by screws to an input terminal of the protection module, whereas the output terminals of the first switch system are connected by screws to the respective conductors of the second bundle.

5. The change-over contact apparatus as claimed in claim 4, wherein the supporting base has a bearing surface for cooperation with a supporting wall and an opposite surface and a disconnecting switch device is connected between said input terminals and said first bundle of conductors and is located between an insulating piece maintaining the conductors of said first bundle in position and said opposite surface of the supporting base and between said input terminals and said removable cartridges.

6. The change-over contact apparatus as claimed in claim 4, the supporting base has a bearing surface for cooperation with a supporting wall and an opposite surface and a disconnecting switch device is connected between said input terminals and said first bundle of conductors and is located between an insulating piece maintaining the conductors of said first bundle in position and said opposite surface of the supporting base and between said input terminals and said removable cartridges and each of the conductors of said first bundle is formed by a thin amagnetic cut out piece, said cut out piece being provided with bent lugs for connection with the input terminals of the respective cartridges, said cut out piece further having parallel rectilinear portions cooperating with said insulating piece, said disconnecting switch device having contact bridges provided with resilient jaws and said cut out piece having knives cooperating with said resilient jaws.

7. The change-over contact apparatus as claimed in claim 6, wherein said insulating piece has baffles providing an insulation for the conductors of the first bundle, the apparatus having a closure lid which together with the insulating piece, forms a plurality of pockets housing the cartridges and the input terminal equipped with said knives.

8. The change-over contact apparatus as claimed in claim 1, wherein first and second auxiliary switches are respectively placed in series with the respective coils of the first and second electromagnets, said auxiliary switches being opened simultaneously by a control means which is actuated during tripping of said tripping mechanism.

9. The change-over contact apparatus as claimed in claim 8, wherein a device for protection against the absence of voltage, and a device for protection against insulation defects, which are disposed in the first space, further cause the simultaneous opening of the first and second auxiliary switches.

10. The change-over contact apparatus as claimed in claim 1, wherein the armature of the first electromagnet drives first electric switching means for locking the second switch system, whereas the armature of the second electromagnet drives second electric switching means for locking the first switch system, said first and second electric switching means being disposed in said first space.

11. The change-over contact apparatus as claimed in claim 1, wherein first and second auxiliary switches are respectively placed in series with the respective coils of the first and second electromagnets, said auxiliary switches being opened simultaneously by a control means which is actuated during tripping of said tripping mechanism, the armature of the first electromagnet further opening the second auxiliary switch, whereas the armature of the second electromagnet opens the first auxiliary switch.

12. The change-over contact apparatus as claimed in claim 1, wherein said inter-armature mechanical locking means are formed by a single lever which is pivotally mounted on said base and moving in a predetermined plane parallel to said median plane and which comprises coupling means cooperating with one of the armatures of the first and second electromagnets and first and second mutually cooperating active end portions each provided with edges, the second active end portion being angularly fixed to a support of the armature of the other electromagnet.

13. The change-over contact apparatus as claimed in claim 12, wherein said lever has a first arm which forms said coupling means and a second arm which is provided with said first active end portion and adjustment means act by pressure for causing deformations of the first and second arms and for modifying in two rectangular directions the reset position of the edge of the first active end portion with respect to the edge of the second active end portion.

14. The change-over contact apparatus as claimed in claim 12, wherein said edges define respective curved surfaces which form predetermined angles with said plane, so as to counteract reciprocal lateral sliding effects of said curved surfaces.

* * * * *